E. J. MURPHY & J. EATON.
MOTOR CONTROL SYSTEM.
APPLICATION FILED MAY 4, 1912.
1,041,845.
Patented Oct. 22, 1912.
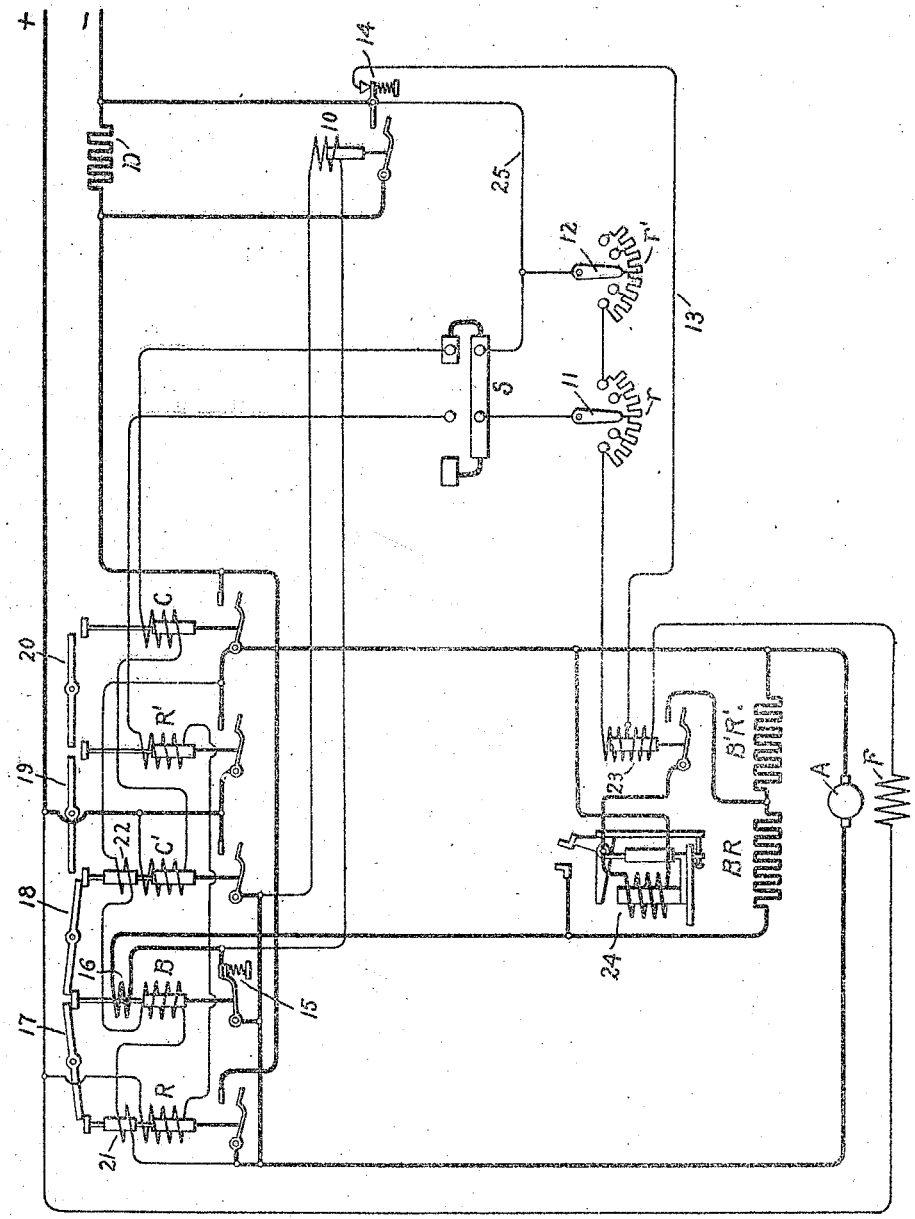
WITNESSES:
J. Earl Ryan
J. Ellis Glen
INVENTORS:
EDWIN J. MURPHY,
JOHN EATON,
BY
THEIR ATTORNEY.

UNITED STATES PATENT OFFICE.

EDWIN J. MURPHY AND JOHN EATON, OF SCHENECTADY, NEW YORK, ASSIGNORS TO GENERAL ELECTRIC COMPANY, A CORPORATION OF NEW YORK.

MOTOR-CONTROL SYSTEM.

1,041,845.

Specification of Letters Patent.

Patented Oct. 22, 1912.

Application filed May 4, 1912. Serial No. 695,139.

*To all whom it may concern:*

Be it known that we, EDWIN J. MURPHY, a citizen of the United States, and JOHN EATON, a subject of the King of Great Britain, both residing at Schenectady, county of Schenectady, State of New York, have invented certain new and useful Improvements in Motor-Control Systems, of which the following is a specification.

This invention relates to the control of electric motors and has for its object the provision of means whereby an electric motor may be started, stopped, and generally controlled in a reliable and efficient manner.

Our invention relates more specifically to the control of reversible electric motors, one of the objects of our invention being to provide means whereby an electric motor may be quickly stopped and its direction of rotation reversed.

While our invention is capable of general application, we have found it particularly useful in connection with such mechanism as planers, printing presses, and the like, in which the direction of movement of a heavy mass must be reversed periodically. It is essential that in this case the motor must be brought to rest quickly and then started in the opposite direction with a minimum strain on the apparatus. To this end we connect the electric motor directly and positively to the machine to be driven and provide means whereby the motor is periodically stopped and reversed. In the use of these machines, as in the case of a planer, the operation is controlled by a master switch which is operated at or near the limit of movement in each direction in the ordinary manner. This switch changes the connections of a plurality of electromagnetic switches or contactors which reverse the motor. Of course the reversal cannot take place immediately since the bed of the planer and the motor armature which have considerable inertia, must first be stopped. It is therefore essential that the contactors which bring about the reversal of the motor should not be closed until the motor is brought substantially to rest. It has been found that the motor which drives the bed of the planer or similar machine may be quickly stopped by dynamic braking of the motor, that is, by causing the motor to act as a generator and deliver current against a resistance.

One of the objects of our invention, therefore, is to provide improved means for dynamically braking the motor so as to bring it quickly to rest without injury to the motor, as by sparking at the commutator.

In the operation of planers and the like it is customary to have the bed of the machine run faster on its return stroke when no work is being done than on the forward stroke when the cut is being taken. It is also customary to provide means for adjusting the speed according to the character of the material, the depth of the cut, etc. When the planer is driven by an electric motor, this variation of speed is best accomplished by varying the field strength of the motor so that normally the motor will be running upon a weakened field. When, however, the motor is stopped by dynamic braking, it is necessary that the field be strong, since the stronger the field the greater the dynamic braking effect that can be obtained. If, however, the motor is operating with a weakened field when it drives the load, it is impossible to have the field at maximum strength the moment the master switch is operated to cause the dynamic braking circuit to be closed because the field will not immediately come to full strength when the field resistance is cut out of circuit. Instead it will build up gradually due to the inductive effect of the field circuit. If, therefore, the dynamic braking circuit is so adjusted that the armature current will be the maximum that the motor is able to handle without sparking at the moment when the dynamic braking begins, the current will be considerably larger than the armature is able to handle when the field has built up to its maximum strength. In an application of J. E. Brobst, Serial No. 692,957, filed April 24th, 1912, and assigned to the assignee of this application, there is described and claimed means whereby the dynamic braking may be graduated to the strength of the motor field, that is, the initial braking current will be relatively low and will be automatically increased as the field strength builds up.

One of the objects of our invention is to provide improved means whereby this graduated braking effect is produced.

Another object of the invention is to simplify the entire system so as to reduce the number of electromagnetic switches or contactors and substantially eliminate the electrical interlocks.

Other objects and purposes of our invention will appear in the course of the following specification in which we have shown our invention embodied in concrete form for purposes of illustration.

Referring to the drawing which shows diagrammatically one embodiment of our invention, A represents the armature and F the shunt field of an electric motor for driving a planer or the like. The direction of rotation of this motor is controlled by four electromagnetic switches or contactors, two for each direction of rotation. Two of these switches are designated C and C', respectively, since they connect the motor for driving the planer in the forward or "cutting" direction, while the other two switches are designated R and R', respectively, since when closed they drive the planer in the opposite or "return" direction. These four switches are operated by shunt windings controlled by the master switch S. In the drawing the parts are shown in the positions assumed when the main line is deënergized. When the switch S is in the position shown in the drawing and the line is energized, the windings of the contactors C and C' are energized in series across the line, while with the switch in the opposite position the windings of the two contactors R and R' are similarly connected across the line. A starting resistance D is provided for the motor, this resistance being controlled in this case by an electromagnetic switch 10 connected so as to close and short circuit the resistance when the counter electromotive force of the motor rises to a predetermined value. The particular connection of this switch in the system is important for reasons hereinafter set forth. For varying the speed of the motor we have provided two rheostats, one of which has a resistance $r$ which is regulated by a lever 11, while the other has a resistance $r'$ regulated by a lever 12. When the motor is starting, and in fact, whenever the switch 10 is open, both of the resistances $r$ and $r'$ are short circuited through the wire 13 and a switch 14 which is spring closed. When the switch 10 closes, the switch 14 is opened so as to break this short circuit. When, therefore, the switch 10 is closed and the master switch S is in the position shown in the drawing, that is, in the "cutting" position, a portion of the resistance $r$, the amount of which will depend upon the position of the lever 11, will be connected in the field circuit of the motor. When the master switch is moved to the opposite position, the connection to the lever 11 will be broken and all of the resistance $r$ and a portion of the resistance $r'$ will be connected in series with the motor field.

In order to bring the motor armature to rest quickly we have provided a braking resistance through which the motor armature is short circuited. This braking resistance is divided into two sections B R and B' R'. The object of these two sections of resistance is to graduate the dynamic braking current in accordance with the field strength, that is, to gradually increase the braking current as the field strength builds up. For making the dynamic braking connections we provide the contactor B. This contactor is normally held closed by a spring 15. The winding of this contactor is connected across the armature of the motor so that while the motor is operating the winding tends to hold it closed. The contactor is likewise provided with a series winding 16 which is not energized until the contactor is closed, but which holds the contactor closed until the armature has practically ceased to rotate. The five contactors R, R', C, C' and B being arranged as shown in the drawing, we provide four mechanical interlocks 17, 18, 19 and 20, coöperating with the contactors so as to compel operation in a predetermined manner. The particular construction of these interlocks forms no part of our invention, but for purposes of illustration we have shown bars pivoted at their middle points, the two ends of each bar being engaged by upwardly projecting stems of two adjacent contactors in their closed position. For instance, when the contactor C closes the interlocking bar will be turned so as to prevent the contactor R' from closing. Likewise when the contactor C' is closed it prevents contactor R' from closing. The interlocking bars 17 and 18 prevent the contactors R and C' from closing whenever the motor is being dynamically braked, until it is brought substantially to rest. While the contactor B is closed by a spring, this spring is not necessarily very stiff so as to apply any considerable pressure to the contactor, since electromagnetic means are provided for holding the contactor tightly closed. One object in having the contactor spring-closed is to insure that the dynamic brake is always applied when the controller is in the off position. The spring 15 is therefore of such a strength that it will move the contactor to closed position but will also allow the contactor to be opened by either of the interlocking bars 17 or 18. In other words, when either the contactor R or C' closes, the contactor B is forced open by one of the interlocks 17 or 18, but neither of these contactors will close when it is energized until the magnetic force holding the contactor B closed is reduced substantially to zero. Both of the contactors R and C' are preferably provided with windings 21 and 22, respectively, connected across the armature in series with contactor B for holding these contactors in open position until the motor armature has come substantially to rest. These windings when provided are simply an additional precaution, since the contactors are also held open by the mechanical interlocks. In order that the electromagnetic switch 10 shall be open when the brake contactor is closed, we have arranged the winding of this contactor so as to be short circuited when the brake contactor closes. When the brake contactor is open the winding of switch 10 is connected across the armature in series with the brake resistance and series winding 16 but when the brake contactor closes, the winding is short circuited so that it is caused to open, thereby short circuiting the field resistances and rendering the switches active which control the brake resistance, as hereinafter described.

One of the important features of our invention is the provision of the electromagnetic switch or relay 23 for controlling the brake resistance. This relay is provided with a winding having one terminal connected with the shunt field F while the other terminal is connected with the resistance r. The winding of this relay is divided into two halves which are differential or oppose each other so that when the two halves are energized they neutralize each other and the relay will not close. The middle point of this winding is connected to the negative side of the line through the wire 13 and switch 14. It is obvious that when the switch 14 is opened, the field current must pass through the two differential portions of the relay winding and through any field resistance which may be in circuit to the negative side of the line. The relay 23 is therefore inoperative under this condition. When, however, the switch 14 is closed, the upper half of the relay winding and the field resistance are short circuited so that only one half of the winding of the relay is energized and the relay therefore becomes active. The winding of this relay is so adjusted that when the field current approaches a maximum, that is, when the field is nearly full strength, the relay 23 will close, but when the field is weak the relay will not close even though only one of the windings of the relay is energized. When the switch 14 closes the field resistance is short circuited so as to strengthen the field, but, as above explained, the field increases gradually due to the inductive effect and until the field strength reaches a predetermined value which is preferably near the maximum the relay 23 will not operate. When it does operate it short circuits a section of braking resistance B' R' through the series winding of the relay 24. This relay 24 is preferably of the type which will not close upon a rush of current incident to the cutting out of a resistance section but will close when the current decreases to a predetermined value; that is, when the armature has sufficiently slowed down. Such a relay is described and claimed in a pending application filed by Edwin J. Murphy on February 15th, 1911, Serial No. 608,652 and assigned to the same assignee as this application. When relay 24 closes, the motor will be short circuited through the windings 24 and 16. We have shown the relay 24 as of the particular type described merely for purposes of illustration, but any other well known means for causing the delay in the cutting out of the last section of resistance may be employed without departing from the spirit of our invention.

The mode of operation of our system as thus constructed and arranged is as follows: Assuming that the switch S has been thrown into the position shown in the drawing in some manner, as, for instance, by movement of the planer bed, the contactors C and C' will be energized in series through the right hand contacts of the master controller S and back to line through the wire 25. This will close the motor circuit from the positive side of the line, through the contactor C', armature A, contactor C and resistance D back to line. This will operate interlocking bars 19 and 20 to prevent the closing of the contactor R' and also operate interlocking bar 18 which will open the brake contactor B against the tension of the spring 15. The motor will now start with the starting resistance D in series. When the motor comes up to a predetermined speed the counter electromotive force switch 10 will close to short circuit the resistance D. The closing of switch 10 opens the switch 14 which opens the short circuit around the field resistance so that a resistance is connected in the shunt field to bring the motor to the speed for which the lever 11 is set. The field circuit of the motor will now be from the positive side of the line, through field F, through the differential windings of the relay 23, through resistance r, lever 11, through the contacts on the master switch and back to line through wire 25. The motor will now be running with a weakened field and the relay 23 will be inoperative. When the reversing switch S is thrown by the bed of the planer reaching the limit of its movement in the cutting direction, contactors C and C' are first deënergized. This permits the brake contactor to close in response to the tension of the spring 15 since the interlocking bar 18 is released. The winding of this contactor which is connected across the armature coöperates with the spring in pressing the contacts tightly together upon the initial closing and when the contacts are fully closed the winding 16 operates to force the contacts together still harder. The contactor R' which has been energized by the throwing of the switch to the opposite position may also close; since the interlocking bars 19 and 20 are released. The contactor R cannot, however, close, since it is held open by the holding out winding 21. After the brake contactor is closed contactor R is also held open by the interlocking bar 17. The opening of the contactors C and C' disconnects the motor from the line and the closing of contactor B connects the motor armature in a closed circuit through the two sections of resistance B R and B' R' and winding 16, through the contacts of the contactor B. The closing of the contactor B also short circuits the winding of switch 10 which opens so as to insert the resistance D for the return movement and also allows the switch 14 to close to strengthen the field by short circuiting the field resistance r and r' and the upper winding of the field relay 23. The field does not build up immediately, but as the braking current is relatively low since the two sections of braking resistance are in circuit no sparking will result at the commutator. The relay 23 is now, however, responsive to the strength of the field since it is not differentially energized and therefore when the field builds up, the relay 23 will close and cut out the section of braking resistance B' R'. This occurs when the field has reached a predetermined strength which is near the maximum so that the braking current may be considerably increased without sparking at the commutator. The cutting out of the resistance B' R' increases the braking current up to the limit of commutation of the motor thereby avoiding sparking and slows the motor down. As the motor slows down the braking current diminishes until finally the relay 24 closes due to the decrease of current to complete a short circuit and bring the motor to rest or substantially so. It is obvious of course that the motor could be brought to rest without cutting out the section B R and in this case the relay 24 would be unnecessary. When the motor is practically stopped, the holding out winding 21 becomes substantially deënergized, as does also the winding of the brake contactor which is in series with the winding 21. The winding 16, which holds the brake contactor tightly closed during braking, also releases so that the contactor R will now open the contactor B against the tension of the spring 15. The two contactors R and R' being now closed, the motor will start in the reverse direction with full field strength and with the resistance D in series with the armature circuit. As the motor speeds up the switch 10 will again close and short circuit the resistance D, opening the switch 14 to insert the field resistance. The field circuit will now be through all of the resistance r, and a portion of resistance r' which will be determined by the position of the lever 12. This will drive the motor at a greater speed than it had during the forward motion. At the end of the stroke the switch S will again be operated, dropping out the contactors R and R' and the brake contactor will again close. In a similar manner the braking will first take place through the two sections of braking resistance and when the field builds up one section will be cut out and then the other until the motor armature has stopped.

It will be seen that we have provided a simple and effective arrangement whereby the field relay which brings about the graduated braking is controlled at the same time that the field is weakened without opening any circuits, and without electrical interlocking connections. Furthermore, by connecting the switch 10 across the brake contactor, the opening of the switch is assured so that the resistance D will without fail be connected in the motor circuit upon reversal. The mechanical interlocking of the contactors and connections of the windings simplify the connections and reduce the number of contactors to a minimum.

It will be understood, of course, that while we have shown our invention embodied in concrete form and as operating in a specific manner in accordance with the patent statutes, we do not desire to limit our invention thereto, since various modifications thereof will suggest themselves to those skilled in the art without departing from the spirit of our invention, the scope of which is set forth in the annexed claims.

What we claim as new and desire to secure by Letters Patent of the United States, is:—

1. The combination with an electric motor, of reversing mechanism therefor, a brake resistance, means for short circuiting the motor armature through said resistance when the reversing mechanism is operated to produce a dynamic braking effect, a resistance connected in the field circuit of the motor during normal operation, an electromagnetic switch which is inactive during normal operation of the motor for cutting out a section of said brake resistance, and means for rendering said switch active and dependent for its operation upon the field strength of the motor when the reversing mechanism is operated.

2. The combination with a reversible electric motor, of contactors for closing the motor circuit for either forward or reverse movement, a brake resistance, a contactor for closing a braking circuit through the motor and resistance, interlocking mechanism between the brake contactor and the line contactors to prevent the closing of the brake contactor when either line contactor is closed, a resistance connected in the field circuit of the motor during normal operation, a master switch and means whereby the field resistance is short circuited, the line contactors opened, and the brake contactor closed upon the operation of the master switch.

3. The combination with an electric motor, of a controlling switch therefor, a braking resistance, means for short circuiting the motor armature through the said resistance to produce a dynamic braking effect when the switch is operated, an electromagnetic switch for controlling the dynamic braking circuit, actuating windings in the field of the motor during normal operation, and means for deënergizing one of said windings upon the operation of the switch to permit the electromagnetic switch to operate upon a sufficient flow of current.

4. The combination with an electric motor, of a controlling switch therefor, a braking resistance arranged for short circuiting the motor armature through the said resistance to produce a dynamic braking effect when the switch is operated, an electromagnetic switch for cutting out a section of said brake resistance having differential actuating windings in series with the field of the motor during normal operation, and means for deënergizing one of said windings upon the operation of the switch to permit the electromagnetic switch to operate upon a sufficient flow of current.

5. The combination with a reversible electric motor, of a master switch for controlling the same, a pair of line contactors for each direction of rotation energized through said master switch, a brake resistance, a contactor for closing a braking circuit through the motor and a resistance, a mechanical interlock between the brake contactor and one of each pair of line contactors, a resistance connected in the field circuit of the motor during normal operation, and means whereby the field resistance is short circuited, the actuating windings of the line contactors deënergized, and the brake contactor closed upon the operation of the master switch.

6. The combination with an electric motor, of reversing mechanism therefor, a brake resistance, a brake contactor for short circuiting the motor armature through said resistance to produce a dynamic braking effect when the reversing mechanism is operated, a starting resistance for said motor, a contactor for short circuiting said starting resistance having its actuating winding connected across the brake contactor so as to be deënergized when the brake contactor is closed, a resistance connected in the field circuit of the motor during normal operation, and a switch for short circuiting said resistance when the starting resistance contactor is opened.

7. The combination with an electric motor, of reversing mechanism therefor, a braking resistance, means for short circuiting the motor armature through the said resistance to produce a dynamic braking effect when the reversing mechanism is operated, an electromagnetic switch controlling said brake resistance having differential actuating windings in series with the shunt field of the motor during normal operation, and means for deënergizing one of said windings upon the operation of the reversing mechanism to permit the switch to operate upon a sufficient current flow.

8. The combination with an electric motor, of reversing mechanism therefor, a braking resistance, means for short circuiting the motor armature through the said resistance to produce a dynamic braking effect when the reversing mechanism is operated, an electromagnetic switch for cutting out a section of said brake resistance having differential actuating windings in series with the shunt field of the motor during normal operation, and means for deënergizing one of said windings upon the operation of the reversing mechanism to permit the switch to operate upon a sufficient current flow.

9. The combination with an electric motor, of reversing mechanism therefor, a brake resistance, means for short circuiting the motor armature through said resistance when the reversing mechanism is operated to produce a dynamic braking effect, a resistance connected in the field circuit of the motor during normal operation, an electromagnetic switch having differential actuating windings in series with the motor field and resistance for cutting out a section of said brake resistance, and means for short circuiting the field resistance and one of said actuating windings upon the operation of the reversing mechanism to permit the switch to operate when the field builds up.

10. The combination with a reversible electric motor, of line contactors for closing the motor circuit for either forward or reverse movement, a brake resistance, a contactor for closing a braking circuit through the motor and resistance having an actuating winding connected across the motor armature, mechanical interlock mechanism between the brake contactor and the line contactors to prevent the closing of the brake contactor when either line contactor is closed, a resistance connected in the field circuit of the motor during normal operation, a master switch, and means whereby the field resistance is short circuited, the line contactors opened and the brake contactor closed upon the operation of the master switch.

11. The combination with a reversible electric motor, of two pairs of contactors for closing the motor circuit for either forward or reverse movement, a brake resistance, a contactor for closing the braking circuit through the motor and resistance having an actuating winding connected across the motor armature, holding out windings for one of each pair of line contactors connected across the armature, mechanical interlocking mechanism between the brake contactor and said two line contactors to prevent the closing of the braking contactor when either line contactor is closed, a resistance connected in the field circuit during normal operation, a master switch, and means whereby the field resistance is short circuited, the line contactor opened and the brake contactor closed upon the operation of the master switch.

12. The combination with an electric motor, of reversing mechanism therefor, a brake resistance, means for short circuiting the motor through the brake resistance when the reversing mechanism is operated to produce a dynamic braking effect, a resistance connected in the field circuit of the motor during normal operation, a plurality of electromagnetic switches which are inactive during the normal operation of the motor for cutting out sections of the brake resistance, and means for rendering said switches active and dependent for their operation upon the field circuit of the motor when the reversing mechanism is operated.

13. The combination with an electric motor, of reversing mechanism therefor, a brake resistance, a brake contactor for short circuiting the motor armature through said resistance to produce a dynamic braking effect when the reversing mechanism is operated, a starting resistance for said motor, a contactor for controlling said starting resistance having its actuating winding connected across the brake contactor so as to be deënergized when the brake contactor is closed, a resistance connected in the field circuit of the motor during normal operation, an electromagnetic switch which is inactive during normal operation of the motor for cutting out a section of said brake resistance, and means for short circuiting the field resistance and rendering said electromagnetic switch active and dependent for its operation upon the field strength of the motor when the starting resistance contactor is opened.

14. The combination with an electric motor, of reversing mechanism therefor, a brake resistance, a brake contactor for short circuiting the motor armature through said resistance to produce a dynamic braking effect when the reversing mechanism is operated, a starting resistance for said motor, a contactor for short circuiting said starting resistance having its actuating winding connected across the brake contactor so as to be short circuited when the brake contactor is closed, a resistance connected in the field circuit of the motor during normal operation, an electromagnetic switch for cutting out a section of said brake resistance having differential actuating windings in series with the field of the motor, and a switch for short circuiting the said field resistance and one of the windings when the starting resistance contactor is opened.

15. The combination with an electric motor, of reversing mechanism therefor, a brake resistance, a brake contactor for short circuiting the motor armature through said resistance to produce a dynamic braking effect thereon when the reversing mechanism is operated, an electromagnetic switch for cutting out a section of said brake resistance, a resistance connected in the field circuit of the motor during normal operation, and means whereby said field resistance is short circuited upon the closing of said brake contactor and said switch rendered dependent for its operation upon the field strength of the motor so as to be operated to cut out a section of brake resistance upon a sufficient flow of field current.

16. The combination with a reversible electric motor, of a master switch for controlling the same, a pair of line contactors for each direction of rotation energized through said master switch, a brake resistance, a contactor for closing a braking circuit through the motor and resistance having an actuating winding connected across the motor armature, a mechanical interlock between the brake contactor and one of each pair of line contactors, a holding out coil connected across the motor armature for each of said interlocked line contactors, a resistance connected in the field circuit when the motors are in normal operation, and connections whereby the field resistance is short circuited, the actuating windings of the line contactors for one direction of rotation deënergized, and the actuating winding of the line contactors for the opposite direction of rotation energized upon the operation of the master switch.

In witness whereof, we have hereunto set our hands this 3rd day of May, 1912.

EDWIN J. MURPHY.
JOHN EATON.

Witnesses:
BENJAMIN B. HULL,
HELEN ORFORD.